United States Patent
Webb

(10) Patent No.: US 10,789,154 B2
(45) Date of Patent: Sep. 29, 2020

(54) CLIENT SERVER COMPUTER CODE MAPPING AND VISUALIZATION

(71) Applicant: Code Walker L.L.C., Houston, TX (US)

(72) Inventor: Chilton Webb, San Antonio, TX (US)

(73) Assignee: CodeWalker L.L.C., Houston, TX (US)

( * ) Notice: Subject to any disclaimer, the term of this patent is extended or adjusted under 35 U.S.C. 154(b) by 0 days.

(21) Appl. No.: 16/753,186

(22) PCT Filed: Oct. 2, 2018

(86) PCT No.: PCT/US2018/053850
§ 371 (c)(1),
(2) Date: Apr. 2, 2020

(87) PCT Pub. No.: WO2019/070630
PCT Pub. Date: Apr. 11, 2019

(65) Prior Publication Data
US 2020/0242009 A1    Jul. 30, 2020

Related U.S. Application Data

(60) Provisional application No. 62/566,919, filed on Oct. 2, 2017.

(51) Int. Cl.
*G06F 11/36*    (2006.01)
*G06F 16/901*   (2019.01)
*G06F 8/41*     (2018.01)

(52) U.S. Cl.
CPC .......... *G06F 11/3664* (2013.01); *G06F 8/427* (2013.01); *G06F 16/9027* (2019.01)

(58) Field of Classification Search
CPC .. G06F 11/36; G06F 11/3664; G06F 11/3668; G06F 11/366; G06F 11/0703
(Continued)

(56) References Cited

U.S. PATENT DOCUMENTS 5,371,747 A * 12/1994 Brooks ............... G06F 11/3624
714/38.1
6,226,787 B1 * 5/2001 Serra ................... G06F 11/3664
714/E11.217
(Continued)

FOREIGN PATENT DOCUMENTS

WO    2005008488    1/2005

OTHER PUBLICATIONS

Petricek, "Client Side Scripting Using Meta-Programming", bachelor thesis Aug. 2, 2007 (Aug. 2, 2007) Retrieved from <http://tomasp.net/articles/webtools-thesis/fswebtools.pdf> entire document.
(Continued)

*Primary Examiner* — Kamini B Patel
(74) *Attorney, Agent, or Firm* — Tumey L.L.P.

(57) ABSTRACT

The present disclosure is related to a software program comprising a source code parser configured to read a source code and interpret each function in the source code. In addition, the program generates meta-data about each function. The code parser may weight each function based on the complexity of the calls to each function to generate weighted meta-data. A visualization program may interpret the weighted meta-data and display an interactive visualization to a user.

10 Claims, 5 Drawing Sheets

(58) Field of Classification Search
USPC ........................................................ 714/38.1
See application file for complete search history.

(56) References Cited

U.S. PATENT DOCUMENTS

| | | | | |
|---|---|---|---|---|
| 8,051,408 | B1* | 11/2011 | Johnson | G06F 8/33 715/705 |
| 2003/0061600 | A1* | 3/2003 | Bates | G06F 11/3664 717/133 |
| 2009/0222799 | A1* | 9/2009 | Stewart | G06F 8/427 717/143 |
| 2009/0313613 | A1* | 12/2009 | Ben-Artzi | G06F 8/51 717/137 |
| 2012/0246120 | A1* | 9/2012 | Brooks | H04L 67/34 707/687 |
| 2012/0323940 | A1* | 12/2012 | Davis | G06F 16/958 707/756 |
| 2012/0324295 | A1* | 12/2012 | Horn | G05B 19/058 714/46 |
| 2013/0055223 | A1* | 2/2013 | Xu | G06F 8/42 717/143 |
| 2013/0298110 | A1* | 11/2013 | Boden | G06F 11/3676 717/125 |
| 2013/0326497 | A1* | 12/2013 | Boxall | G06F 11/3632 717/175 |
| 2016/0110543 | A1* | 4/2016 | Park | G06F 21/563 726/22 |
| 2016/0124724 | A1* | 5/2016 | Gautam | G06F 11/3616 717/143 |
| 2017/0109933 | A1* | 4/2017 | Voorhees | G06T 19/00 |
| 2018/0012145 | A1* | 1/2018 | Maurya | G06N 5/022 |
| 2018/0089064 | A1* | 3/2018 | Duer | G06F 11/323 |
| 2018/0157481 | A1* | 6/2018 | Zessin | H04L 9/3239 |

OTHER PUBLICATIONS

International Search Report and Written Opinion for International Application No. PCT/US2018/053850 dated Dec. 11, 2018.

* cited by examiner

CLIENT SERVER COMPUTER CODE MAPPING AND VISUALIZATION

CROSS-REFERENCE TO RELATED APPLICATIONS

This application claims benefit of U.S. Provisional Application No. 62/566,919 filed Oct. 2, 2017, the entirety of which is incorporated herein by reference.

STATEMENT REGARDING FEDERALLY SPONSORED RESEARCH OR DEVELOPMENT

Not applicable.

BACKGROUND OF THE INVENTION

Field of the Invention

This invention relates to the field of computer code visualization and more specifically to the field of computer code parsing and indexing to create visual and interactive objects for computer code.

Background of the Invention

As programmers create software products, they typically have a knowledge of how their computer code flows and the logical structures and interconnections between functions. For simple programs, the programmer may have a complete knowledge of each part of the software but for medium to large size programs it may become difficult or impossible to track all of the functionality. Additionally, with teams of programmers working on a piece of software, each group may not understand how the other group's software functions. If a programmer leaves the software project, knowledge of how the program works may leave as well. Although flowcharts and maps have been used previously to chart functions in a program, the complexity of modern software may be prohibitively large to chart or map. Additional complexity may be encountered when clients and servers communicate as there may be multiple types of programming languages, scripts, and databases intercommunicating for a single operation.

Even experienced programmers may have difficulty in establishing a holistic view of code flow between clients and servers as there currently exists no method of visually inspecting code flow between clients and servers. Current methods require a programmer to individually read the source code for client side programs and server side programs which typically requires that a programmer is familiar with the language, coding style, and the overall design philosophy behind the software programs involved in the client server relationship. Additionally, the software debugging tools available to a programmer may not be powerful enough to capture every kind of software bug with granularity, especially when the bug may be the result of program interactions between clients and server.

Consequently, there is a need in that art for improved visualization of software code that enables a programmer to quickly understand the logic and flow of client server communications and the programs involved in client server interactions.

BRIEF SUMMARY OF SOME OF THE PREFERRED EMBODIMENTS

These and other needs in the art are addressed in one embodiment by a software program comprising a code parser, a code tokenizer, and a visualizer. The code parser may be operable to read a source code file, interpret each line of source code in the source code file, and generate a meta-data file comprising meta-data about each line of source code. The code parser may recursively walk through the source code file to determine interconnections between each line of source code. The code parser may assign a weight to each line of source code based on the complexity of interconnections of each line of source code to generate weighted meta-data. The code tokenizer may be operable to read a source code file and generate tokens based on the content of the source code file. Tokens may be matched from server code and client code to create symbolic links between each. A visualization program may interpret the weighted meta-data and symbolic links and display an interactive visualization to a user.

The foregoing has outlined rather broadly the features and technical advantages of the present embodiments in order that the detailed description that follows may be better understood. It should be appreciated by those skilled in the art that the conception and the specific embodiments disclosed may be readily utilized as a basis for modifying or designing other embodiments for carrying out the same purposes of the present invention.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
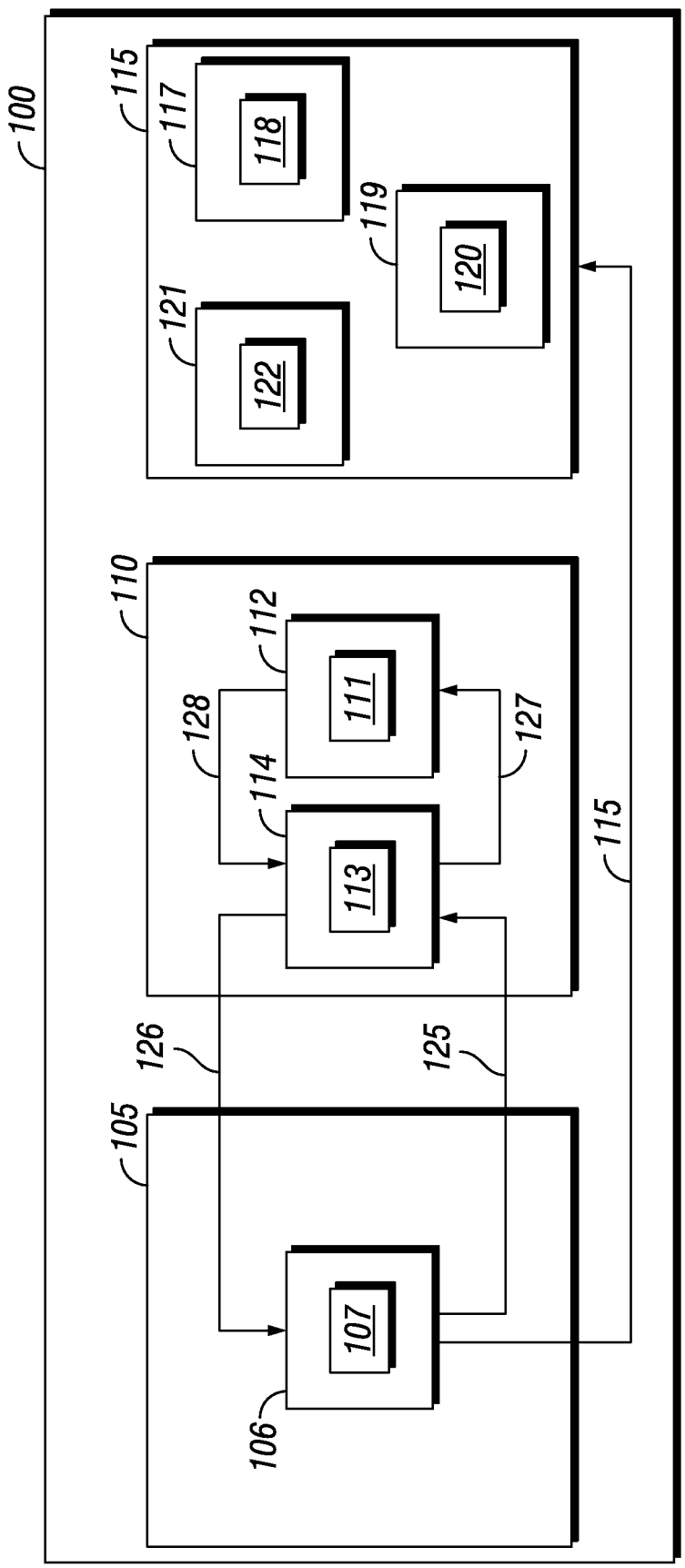
FIG. 1 illustrates a schematic of a program.

A software program may be written in a programming language which is a formal language that specifies a set of instructions that can be used to produce various types of outputs. Programming languages may comprise a syntax or set of rules that define the combinations of symbols considered to be a correctly structured document or fragment of the particular programming language. A programmer may thus create a software program by combining instructions in the correct syntax to achieve a desired result. The list of instructions may be referred to as source code.

A computer's central processing unit (CPU) does not directly run the source code of a program. Rather, the source code is translated into instructions from a higher-level programming language to a lower-level programming language that the CPU can then execute. A CPU may have an instruction set architecture which defines every operation the CPU can perform. The instruction set architecture may be referred to as a machine language as the instructions contained in the instruction set may be directly executed by the CPU. Each instruction in the instruction set architecture may cause the CPU to perform a specific task such as a load, a jump, or add, for example. A compiler may provide translation between the instructions contained in a source code file written in a higher-level programming language to the machine code instructions representative of the instructions.

An example of a higher-level programming language may include any language that is not machine code such as C++, COBOL, or java.

A complicating factor in writing software may be that the higher-level programming language used to write the software is a hybrid language between machine code and human language. A programmer may have a conceptual idea of how they want a program to execute but the concept may be lost in translation between human language and the higher-level programming language. Source code may comprise errors and logical mistakes that may be difficult to recognize due to the hybrid nature of programming languages. Unlike written human languages where the meaning of a particular phrase or sentence may be readily understood by simply reading the phase or sentence, a particular line of source code may not readily understood without examining the context the line of code is presented in and the variables within the line of code. For example, first line of code may be a function that calls another function within a second line of code. In order to understand the operation of the first line of code, the operation of the second line of code must first be understood. For a simple program, one of ordinary skill in the art may readily understand functionality of the simple program by reviewing the source code. However, as the number of lines of code increases, it may become more difficult to have a full understanding of what a particular line of code or block of code will output due to the interconnected nature of most programs. For large software projects manual review of each line source code may be impossible.

As one of ordinary skill in the art will appreciate, the terms procedure, function, subroutine, subprogram, method, and other equivalent terms may refer to any callable subprogram within a larger program. Any particular programming language may have different terminology, rules, and technical effects associated with the terms from another programming language. For example, some programming languages may distinguish between a function which may return a value and a procedure which may perform an operation without returning a value. As used herein, function should be understood to mean any section of a program that performs a specific task regardless of any particular programming language.

A program may comprise an entry point where the operating system transfers control to the program and the program beings to execute. A program may comprise one or more entry points where code execution may begin. In a source code file for a program, an entry point may be the first function that executes. For example in the programming language C, the entry point may be a function called main. The main function in a program written in C may execute which may then call further functions within the program to perform various operations.

With reference to FIG. 1, a schematic example of a program 100 is illustrated. In the present example, program 100 is written in an object-oriented programming programming paradigm. Program 100 may comprise class 105, class 110, and class 115. Each class may comprise objects such as variables, data structures, functions, methods, or any combination thereof. As illustrated in FIG. 1, class 105 may comprise object 106 which may comprise code 107. Class 110 may comprise object 112 and object 114 which may comprise code 111 and code 113 respectively. Class 115 may comprise object 117, object 119, and object 121 which may comprise code 118, code 120, and code 122 respectively. FIG. 1 illustrates only one embodiment of a program. One of ordinary skill in the art will appreciate that a program may comprise any arbitrary number of classes, objects, and code.

In FIG. 1, object 106 may be a main function, for example. Code 107 within object 106 may comprise instructions that call object 114 within class 110. Arrow 125 illustrates object 106 calling object 114. Object 114 may be a function which in turn calls on object 112. Object 112 may be a data structure, such as an array, defined by code 111, for example. Object 112 may pass the requested data back to object 114. Arrow 127 illustrates object 114 calling object 112 and arrow 128 illustrates object 112 returning the requested data to object 114. Object 114 may then perform one or more operations and return the result to object 106 as illustrated by arrow 126. Object 117, object 119, and object 121 may execute within class 115 without being individually called. For example, class 115 may be a class that configures the CPU to output to a user interface, such as a screen. Object 106 may comprise code 107 which calls class 115 to output to the screen the value returned by arrow 126. Arrow 127 represents object 107 calling class 115.

The terra "starting point" may be used to refer to a function that calls another function. In FIG. 1, object 112, object 114, object 106, and class 115 may be considered starting points. Object 106 is the main function and is therefore may defined as a starting point by default whereas object 114, object 112, and class 115 may be considered starting points because they are called. However, object 117, object 119, and object 121 may not be considered starting points unless they are called outside of class 115. As will be discussed in detail below, defining starting points may allow a logical tree of function hierarchy to be established.

As one of ordinary skill in the art will appreciate, a single operation performed by computer code may comprise multiple lines of computer code. For example, a do while loop may be represented as:

```
do{
/*statements*/
} while (expression);.
```

In the above example, the do loop may be shown as 3 lines of code for ease of visualization. Alternatively, the do loop may also be represented as:

do {/*statements*/} while (expression);

However many lines of code a particular operation is displayed as in a source code file may be arbitrary and generally may not affect an output or functionality of the operation. For sake of simplicity, when referencing a particular operation in a source code file, the operation may be referenced by the line number where the operation begins. An operation may be any valid command in the particular programming language the source code file is written in. An operation may be, for example, a function, setting a variable, comparing strings, or any other valid command. Furthermore, a source code file may comprise line delimiters that represent the end of a particular operation. Syntax for the line delimiter may vary by programming language. For example, C based languages may indicate the end of an operation with a semicolon whereas python may use a line feed. In the do while statement above, the line delimiter is a semicolon.

In an embodiment, a code parser may take as input a source code file of a program, a compiled source code of a program, such as an executable, a single function, an object, or any other piece of a computer program that comprises computer code. For sake of brevity, the term code will be used herein to mean any code, compiled or not. The code parser may analyze the code and generate meta-data about the code. The code parser may, for example, read the computer code and search for line numbers where operations begin and end as indicated by a line delimiter. Each operation within the computer code may be referred to as a node and be assigned a node ID by the code parser. The entry point of the code may be assigned a node ID of 0, for example, to denote the entry point function as being a parent node of all other nodes encountered. Although any arbitrary node ID may be assigned to the entry point, for ease of understanding, 0 may be chosen. The code parser may read each line of code to generate a node ID for each operation, a parent node ID for each operation, and a child node ID for each operation. Parent node ID represents each operation that calls another operation and child node ID represents each operation that is called by the operation. The code parser may recursively walk the computer code to capture all instances where an operation appears in the source code file. The code parser may store all the generated metadata in a metadata file.

An example metadata file is illustrated in Table 1 below.

TABLE 1

| Line Number | 1 | 6 | 8 | 14 | 23 | 27 |
|---|---|---|---|---|---|---|
| Node ID | 0 | 1 | 2 | 3 | 4 | 5 |
| Parent ID |  | 0 |  | 1 | 0 | 4 |
| Child ID | 1, 4 | 3 |  |  | 5 |  |

As shown in Table 1, line 1 may be an entry point as evidenced by the node ID being 0 and the parent ID being blank. Node 0 has 2 child nodes which in turn reference back to node 0 being the parent node. As will be appreciated by one of ordinary skill in the art, the methods described herein may allow orphaned code to be readily detected. In table 1, node 2 does not have any parent node IDs or child node IDs associated with it. Node 2 may be considered orphaned code as the computer code associated with node 2 may never execute during the runtime of the program as there is no parent node associated with it.

The code parser may be configured to accept any kind of code including code that is written in different programming languages. As previously discussed, different programming languages may have a disparate structure, syntax, and legal operations. As such, the code parser may be configured to recognize the programming language the code is written in to ensure the code is properly parsed. In some embodiments, the code parser may be able to automatically recognize the programming language and automatically understand the particular syntax of the programming language as well as a list of legal operations and line delimiters. Recognizing the programming language may be necessary to capture all nodes present in a particular set of computer code. The code parser may recognize the programming language by any means such as, without limitation, checking a file extension of the software code file, analyzing the structure of the software code file, checking a file header of the software code file, checking a software code file's meta-data, or from a user's input.

In an embodiment, the code parser may connect to a development environment and request a list of all subroutines in a given program and then recursively request each subroutine called from each of those. The code parser may read the binary data file for the program and generate a list of all jumps and logical connections inside the binary code and generate the metadata file.

As will be appreciated by one of ordinary skill in the art, a software program as a whole may comprise smaller parts that make up the entirety of the software program. For example, the software program may comprise, without limitation, various executables, databases, libraries, scripts, and data files that contribute to the operation of the software program. In general, the various components that make up a software program may be disposed in a file directory accessible to a CPU for execution. In order to effectively connect all parts of a program, the code parser may recursively walk a file directory searching for files that are readable by the code parser. Each file in a directory may be analyzed by the code parser to determine its type and if it may potentially comprise computer code. When the code parser encounters a file it can process, the file may be loaded into memory and executed on by the code parser using the methods previously described.

The code parser may begin to read a file and create a series of data structures in memory, such as a metadata file. The code parser may in addition to recording line number in the metadata file also record the lineage of the node. Lineage may be information about which file the particular node is contained in. As the code parser recursively walks through the directory of files, the metadata file may become increasingly large, eventually containing each operation the software program performs. From the metadata file a tree structure for each node may be created where the program logic is completely recreated without the actual code being present.

As one of ordinary skill in the art will appreciate, multiple programs, scripts, and databases may be involved in transmitting data from a server to a client. The methods described above may allow for interconnections of code within a source code file to be recognized, however, interactions between different programs, running on a client and a server, may not be recognized using the above enumerated techniques. A separate method to determine content of code and thereafter establish interconnections between content of different programs may be required to visualize client-server relationships.

In an embodiment, a tokenizer may be used to determine the functionality of a line of code in a source code file such as if the code contains a declaration, a math formula, a programming concept, a loop, or any other valid function in the programming language the source code file is written in. The tokenizer may step through each character to determine the context of the character and its meaning in the line of code. As used herein, line of code may refer to a statement in a source code file that contains a starting character and a line delimiter. As one of ordinary skill in the art will appreciate, a line of code may be physically displayed in a source code file as multiple lines of code for clarity and ease of reading. The functionality of the line of code may not depend on how it is physically displayed on a screen, but rather the content of the line (or lines) from the first character through the line delimiter. As such, one of ordinary skill in the art will understand that when referring to a line of code the meaning is everything from the first character through the line delimiter regardless if the line of code is arranged on a single line or as multiple lines within the source code file.

A tokenizer may divide a line of code into individual tokens or strings of text with an assigned and thus identified meaning. A token may comprise identifiers, keywords, separators, operators, literals, and comments, for example. An identifier may comprise variables explicitly defined by the programmer that are not pre-defined by the programming language. Keywords may be reserved words that are hard coded into the programming language that are not available as identifiers. Keywords may comprise operations within the programming language such as do, if, case, and while, for example. Separators may comprise punctuation, whitespace, and paired delimiters such as brackets and parenthesis as well as semi-colons. Operators may comprise +, >, and =, for example. Literals may comprise fixed values within source code such as integers, floating-point numbers, and strings, for example, which may be hard coded into the source code.

As one of ordinary skill in the art will appreciate, each programming language may have unique tokens associated with it since there may be differences between available operations, syntax, and legal statements, among other factors, between different programming languages. A tokenizer may utilize a decision tree specific to the programming language the source code is written in to tokenize the source code based on the particular tokens a particular programming language has available. The decision tree may comprise a series of counters and series of nested loops, for example, which step through each character of a line of source code to determine the functionality of the code.

For example, a line of code may read as follows:

```
if (objectName=="this") {
    print("<color='white'>*THIS* </color>");
    return;
}
```

The tokenizer may recognize that the line of code is written in C# based on a file header or a file extension, for example, and then select the decision tree that corresponds to C#. The tokenizer may then start by reading the first character "I." The tokenizer may run through the decision tree to narrow down the possible token the letter "I" may correspond to. As the language is C#, the tokenizer may recognize that the letter "i" may correspond to any one of an identifier, a keyword, or a literal and does not correspond to a separator, an operator, or a comment. The tokenizer may then read the second character "f." In context of the first letter, the tokenizer will recognize that the first and second letters make up the keyword "if" and therefore the next character should be the paired delimiter "(" followed by a Boolean-expression within the "(" and ")" characters. The tokenizer may further recognize the text within any paired quotes as a literal, and not further tokenize the text until it finds a matching end quote. Tokenization may be a part of code compilation and one of ordinary skill in the art in the art will recognize the benefits of tokenizing source code.

Once the tokenizer has compiled a list of all the tokens in a source code file, the token list may be stepped through to determine the implication of each token. For example, a greater than symbol (>) or a less than symbol (<) may have different meanings depending on if the symbols are disposed between two numbers or two words. For example, if the tokenizer output is the following tokens for two example lines of source code:

```
1. word1 . word2 ( word3 )
2. word1 word2 ( word3 word4 )
``` the implication of statement 1 and statement 2 may be determined by the programming language the lines of source code originate from. In the instance that the programming language is Java, statement 1 is likely an object calling a method where word1 is likely the object name with a method named word2 being passed an argument of word3. Additionally, statement 2 is likely a method declaration wherein word1 is the return data type, word2 is the function name, word3 is the first argument type and word 4 is the argument. However, if the programming language is Javascript instead, statement 2 would likely have a different meaning. For example, word1 may be the name of a function, word2 may be the return data type, word 3 may be the first argument name, and word4 may be the return data type. As such, the tokenizer may divide data based on conventions that may be generic to programming languages, but the implication of each token or order of tokens may be specific to the target language the source code is written in. The tokenizer may utilize a decision tree that is specific to the language the source code is written in to determine implications. For example, in C#, a function may use the keyword 'void' to indicate the beginning of a function, while in Javascript the same function might start with the word 'function'. Tokenization is common across most languages, but the order of keywords, and what those keywords are, might be different.

As one of ordinary skill will appreciate, a declaration in a source code specifies properties of an identifier by introducing one or more names into the source code. A declaration may be used for functions, variables, constants, classes, enumerations, and type differences, among others. For example, a function may be declared such as int func( ), for example, which may then be used later in another source code file or in another part of the source code. The complier compiling the source code understands that the function may be called and expect that the function will be defined somewhere in the source code. In general, a function may be called from another location in the source code as long as the function has been declared. A function may be passed arguments as input to the function. A generalized function and arguments may be, for example, func(arg1, arg2, arg3). In the line of source code where the function func is invoked, the arguments may be defined. A function may have multiple arguments as inputs and outputs and may behave differently depending on if all of the arguments are passed to the function or if a subset of arguments are passed to the function. One function may be called in multiple different ways throughout the source code by passing different combinations of arguments to the function, which may lead to one function having different "patterns" of inputs that correspond to different outputs of the function. The patterns of input arguments may vary in number of arguments and identity of the arguments, for example. Cadence may refer to a particular pattern of arguments passed to a function. As described above, tokens may be generated from the content of the source code. These tokens may be matched 1 to 1 in the source code such that cadence of a particular set of arguments in the source code matches cadence of tokens generated from the particular set of arguments.

After the implication step is completed, a next step may be to match function calls with their declarations. Matching calls to declarations may be accomplished by comparing cadence of tokens in lines of code that are not declarations to the cadence of tokens of known function declarations. As discussed above, the order or cadence of arguments, and the equivalent token generated from the argument, passed to a function may determine an output of the function. In an example, a function may be declared as follows:

void whichRoom (int roomNumber, sring buildingName).

The function whichRoom has two arguments, an integer called roomNumber and a string called buildingName. The function declaration would match arguments of whichRoom (4, "Douglas Hotel") but would not match arguments of whichRoom(4) or whihcRoom("Douglas Hotel", 4) even though the unmatched arguments share the same function name and in one case, the same number and type of arguments. The order and type of arguments is as important as the name of the function in the case of matching a called function to its declaration.

In an embodiment, the code parser may parse code involved in client/server communications. In general, there may be many different programming languages, applications, servers, and databases involved in any client server communication. For example, if a user clicks a login button on a website, a Javascript program on the client may then call a PHP script on the server. The server side script may execute other login scripts and programs that in turn may call an SQL database. The SQL database may return data to the server, which then processes the login data. If the login data is correct, the server may serve a webpage to the client web browser. The web browser may render the webpage using a rendering engine such as Trident, Gecko, WebKit, or Blink. One of ordinary skill in the art would understand that the complexity of client server interaction caused by multiple pieces of code may cause difficult to find errors. Although the term server is used herein, the term server should not be interpreted to have special meaning. One of ordinary skill in the art would appreciate that the methods disclosed herein may be used with any code that communicates via any network, local or otherwise, as well as other plug in and wireless interfaces.

The method previously described to parse and tokenize code may be implemented with client and server code. In an embodiment, the code parser may parse code for running on the client side and server size to generate a metadata file for the client and server. The tokenizer described above may be run on each of the client side code and the server size code to generate a client side tokenized file and a server side tokenized file. Matching client and server code may begin by scanning through the client side tokenized file for lines of code that call functions outside of the client side code. Once a function is found, the tokenized arguments may be searched for in the server size tokenized file. If the server size tokenized file contains an entry with the correct cadence of tokens, a symbolic link between the sever side code and client size code may be established. The symbolic link may be an entry in a client side or server size metadata file for example. Alternatively, the server size tokenized file may be scanned for function calls functions outside of the server side code. Once a function is found, the tokenized arguments may be searched for in the client size tokenized file. If the client size tokenized file contains an entry with the correct cadence of tokens, a symbolic link between the sever side code and client size code may be established.

In an example, a client side code may contain the following Javascript code:
xhttp.open("example.php", true);
The command xttp.open is a command that sends a request to a server. In the example, it can be reasonable assumed that the code is invoking a file named example.php on the server and thus a symbolic link between the client side code and server size code may be established if the server contains a file with the name example.php. In general, each function in the client side code that calls a server function may be identified and the corresponding server function in the metadata table identified. In some instances, a direct relationship between the client side and server side functions may not be readily identified due to assumptions that may be made during the step of scanning the metadata files. For example, if a client side Javascript program calls login.php, it may be reasonably assumed that the login.php script resides on the server. In the instance where login.php is not on the server, the parser may ask a user for more information. Additionally, one client side function may call different server functions depending on the arguments or input of the client side function. In such instances, the code parser may mark each location in the server metadata file where the client side functions are called. The server metadata table may also be scanned for functions that call outside of the server program.

Once the symbolic links between the client and server code are established, a visualization may be generated showing the symbolic link between function calls. In one embodiment, the visualization may display a path traveling from a client though a barrier and to a server. A user may quickly identify which functions are communicating with a server by observing which function paths cross over the barrier to the server and how that server will interact with the client once processing is complete. Furthermore, should a server function call a database or other resource, the server may have an additional path with an additional barrier to the database indicating the server call is communicating over a network to another resource.

Performance and telemetry data may be visualized. In general, when a program crashes and generates an error log, the error log does not provide the exact conditions that caused the error to occur. Even in cases where a memory dump is available, the conditions that caused the crash may not be readily apparent. Visualization may aid in tracing the source of the crash by providing the user with a visual path of the execution path of the function that caused the error.

In another embodiment, the code parser may be part of a hypervisor running on the server or client. The hypervisor may run the server or client in a virtual machine such that all data and communications going into and out of the virtual machine are intercepted by the hypervisor. Thus, when an error occurs, the hypervisor is able to see the input conditions that caused the error. A developer may then use the visualization of the server and client programs to trace the execution path and see where the input to the function that caused the error originated.

Visualization may also provide a benefit to managing programming teams. For example, developers working on a client side program can visually see the code execution path across a network to the server. Additionally, developers working on a server side program may see the execution path back to the client side program. For development teams that are separated by spoken language and physical location, visualization may allow easier communication between teams. Visualizations provide a common language to understand how code on one system interacts with code on another system without the need to read and understand each bit of code. Further, a visualization allows a developer who may be unfamiliar with a coding language to understand what the code is doing without having to learn the language.

As previously mentioned, the methods described herein may comprise a code visualizer. A visualizer may then read and analyze the meta-data and produce a visual representation of the meta-data and any symbolic links between a client and server to a user. A user may interact with the visual representation and manipulate the representation to fit the user's needs. For example, the user may select criteria which may exclude some meta-data thereby adjusting the visual representation. To more readily display the functionality of the software to a user, the code parser may generate a weight for each node and store it in the metadata file. Weights of nodes may be calculated by the number of calls each node makes as well as the sum of the calls made by each child node associated with the node. Calculating a weight may allow the visualizer to assess the importance of each node and how to best display the node to a user. During parsing, it may not possible to calculate the exact weight of a particular node since it may not be known how many child or parent nodes the node is associated with until the entire source code is parsed. For some simple functions, such as a loop that only sets a variable for example, weights may be calculated during parsing. However, for more complex functions, the weights for each node may require calculation after parsing is complete.

Once the code parser has read each source code file, the visualizer may interpret the meta-data files and generate a visualization of the code. The visualizer may perform a number of analytical processes on the meta-data. For example, it may search for the functions with the largest weights. The weight of a function may give an indication of the importance of the function in the program. For example, large weight functions may be the most important functions in the overall program as they are the most involved with the functioning of the software. Furthermore, nodes with a relatively larger weight may the parts of the program which took the most time to write which may indicate relative importance. By visualizing the heaviest functions, a user may more readily understand the more complex portions of the code. Symbolic links may also be visualized such that interactions between servers and clients may be seen. The symbolic link may be drawn as a line between the visualized nodes of the server and client, for example.

Figure 2:
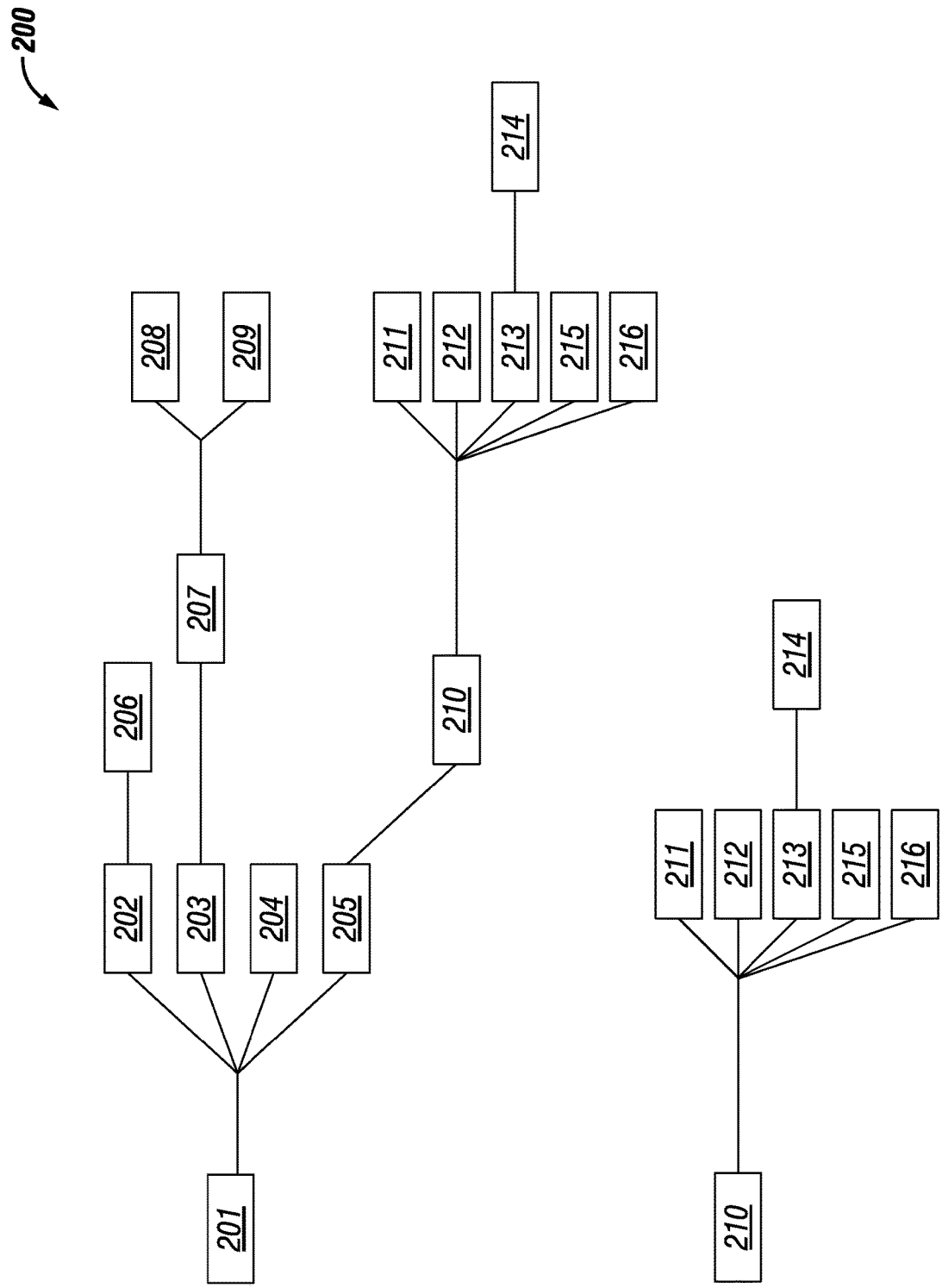
FIG. 2 illustrates a tree.

A wide variety of visualizations may be generated depending on the user's needs. For example, a "tree" of nodes may be displayed. FIG. 2 illustrates and example of a tree 200. As illustrated, tree 200 may comprise nodes 201 through 214 which may be functions, loops, variables, or any other legal operations in the programming language the source code tree 200 represents is written in. A user may be able to use tree 200 to inspect the logical flow of operations of the underlying source code without the need to actually read each individual line of code. The visualizer may generate tree 200 based on a metadata file created from a source code file for a program. The visualizer may read the source code file, check dependencies of each node based on the indications of child nodes and parent nodes and generate tree 200. As illustrated, node 201 may be the entry point for the software program. Node 201 may be identified as the entry point because every other node is dependent on node 201. The metadata file for node 201 would indicate nodes 202, 203, 204, and 205 as being child nodes of node 201. Node 210 and its corresponding child nodes is illustrated twice in tree 200. As previously discussed, a program may have certain functions that may be referred to as starting points because the functions may be called within the particular source code file, or externally from the source code file, such as by another part of the software program. Node 210 is a starting point in tree 200 and may therefore be shown twice to indicate that it is a starting point. If, for example, node 210 did not appear as dependent from node 201, node 210 may not be used anywhere in the software program.

The design of the visualization of the code tree in three dimensional space may be adjusted to fit a variety of scenarios or objectives. A class tree may look more like a series of increasingly faded copies of itself, while a logic tree might look more like a circle with nodes coming off of itself. In a particular embodiment, the lowest level of the visualization tree may represent the higher functions, so functions may displayed like a tree in the real world, with the root indicating the entry point of the function tree. The visualization may be rotated, scaled, or adjusted such that the visual display is presented upside down, while the lower functions may hang down like roots from a tree. In this manner, if function A calls function B, which calls function C, there may be no longer a need to display function B calling function C as a separate tree, nor may there be a reason to show function C on its own. This method of visualization may inherently shows usage, which in turn may allow the developer to not only see the heaviest usage, but may also show unused functions on their own. This may allow to see orphaned code that is no longer in use.

Other types of visual data display are also possible, such as the display of the interaction of two types of code. In an embodiment, a client and server may communicate. One tree representing a client function may show an "end point" where the data is passed to the server, while a visual indicator, such as a colored line, may show that data being transferred to the server code. A second tree for the server code may then show how that data is used, and show the return data. In particular, such a server-client visualization may provide information about database usage among other resource monitoring tasks. Additionally, the method of metadata visualization may allow easier understanding of complex systems with different computer code languages interacting at different steps. In the case of a client/server, the client may use a web browser built with JavaScript, C++, and XUL which interfaces with a server coded in C and XML which in turn interfaces with a database coded in SQL. The complex relationship between each step may be impossible for a human to conceptualize, much less monitor. Visualizing metadata generated by parsing each program (browser, server, database) may simplify the task of debugging and allow a programmer to instantly visualize complex functions.

Figure 3:
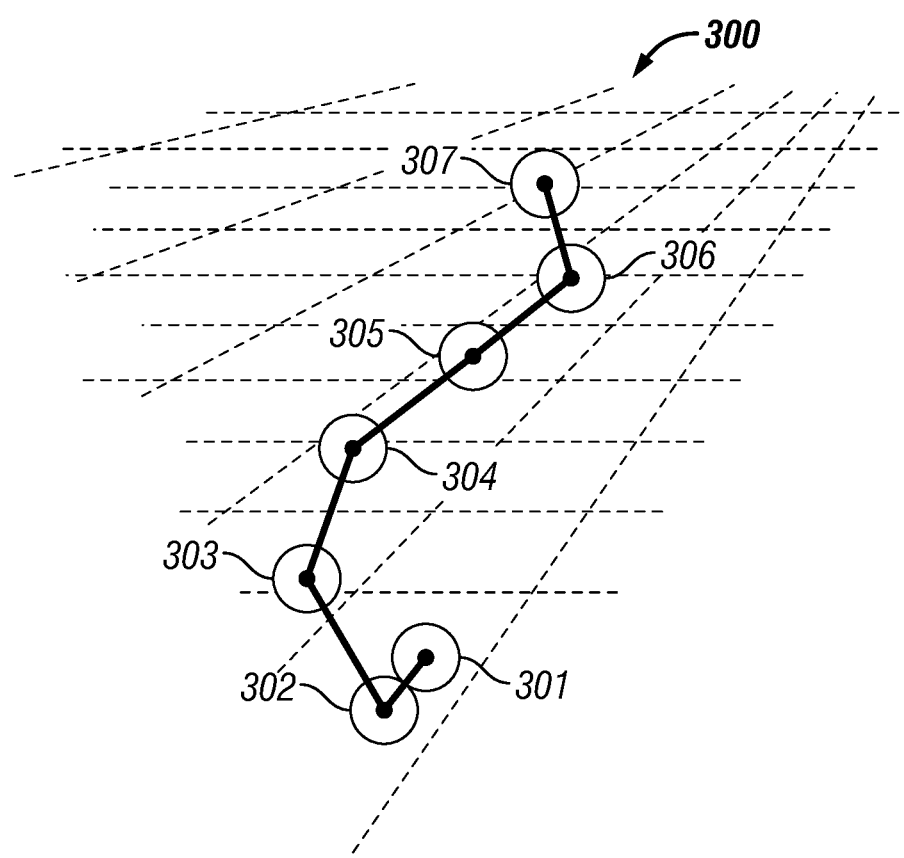
FIG. 3 illustrates a metadata visualization.

FIG. 3 illustrates another example of a visualization 300 generated from a metadata file. Visualization 300 may comprise nodes 301-307 arranged such that the lineage of each node from the metadata file is visually illustrated. Node 301 is a starting point in visualization 300. A starting node may be identified by a different color than the other nodes or by being represented as being closest to the bottom of visualization 300, or by any other means. Visualization 300 illustrates each node as a circle, however, the nodes may be represented by any shape. The nodes may be connected by lines, which may represent communication between the nodes. In this manner, a map is produced showing the relative connection of each function. A user may then visually navigate the map and see all the functions rather than reading the functions in the original source code. For instance, lines on this map connect nodes. The entirety of a program may be displayed and viewed in this manner. A user may further zoom into areas of interest. Selecting a node may bring up an information dialog for that node, which may link to the source code itself and provide additional information.

Figure 4:
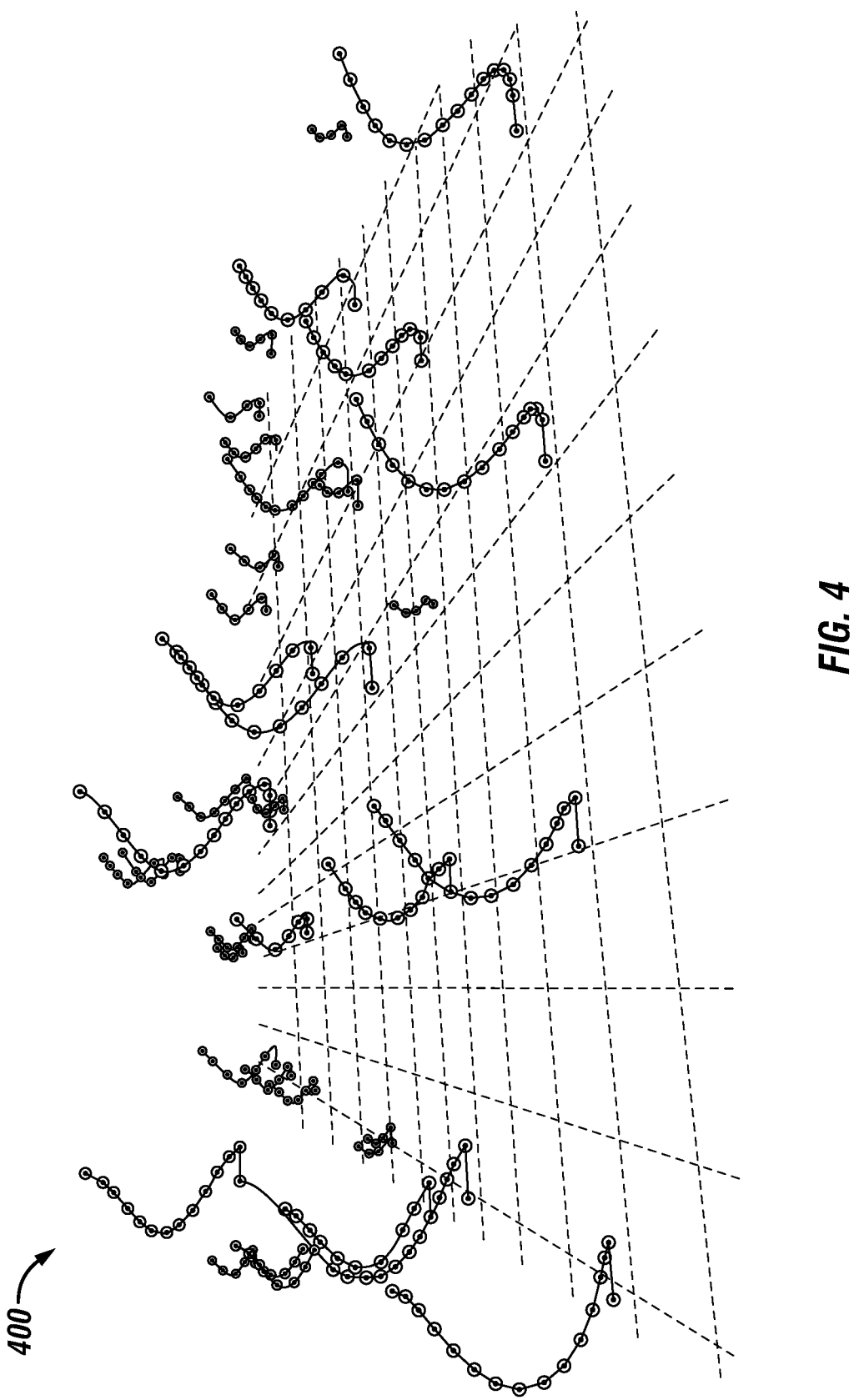
FIG. 4 illustrates a metadata visualization.

FIG. 4 illustrates a more advanced visualization 400 generated from a metadata file. FIG. 4 illustrates a plurality of staring point nodes and their corresponding child nodes connected by lines. The visualizer may analyze metadata from the metadata file to generate visualization 400 of the metadata. FIG. 4 illustrates starting point nodes displayed on a grid with dependent child nodes as circles with interconnected lines above the grid. In this embodiment, lines represent connections between objects. In an object oriented programming language, objects may be interoperable and there may be only one instance of each object on the grid with lines crisscrossing each other between objects, or arcing over the tops of other objects. From each node, the logical flow of the source code is displayed with a vertical climb for each successive step through the source code. The logical flow from any one point in code to another, if such a pathway exists, may be viewed directly, and complexity may readily be identified by looking for the visibly tallest structures. The visualization may be manipulated to for example, display a single starting point node and all subsequent functions that are connected to the starting point node. Alternatively, all the starting point nodes and dependent child nodes may be displayed at one time.

Figure 5:
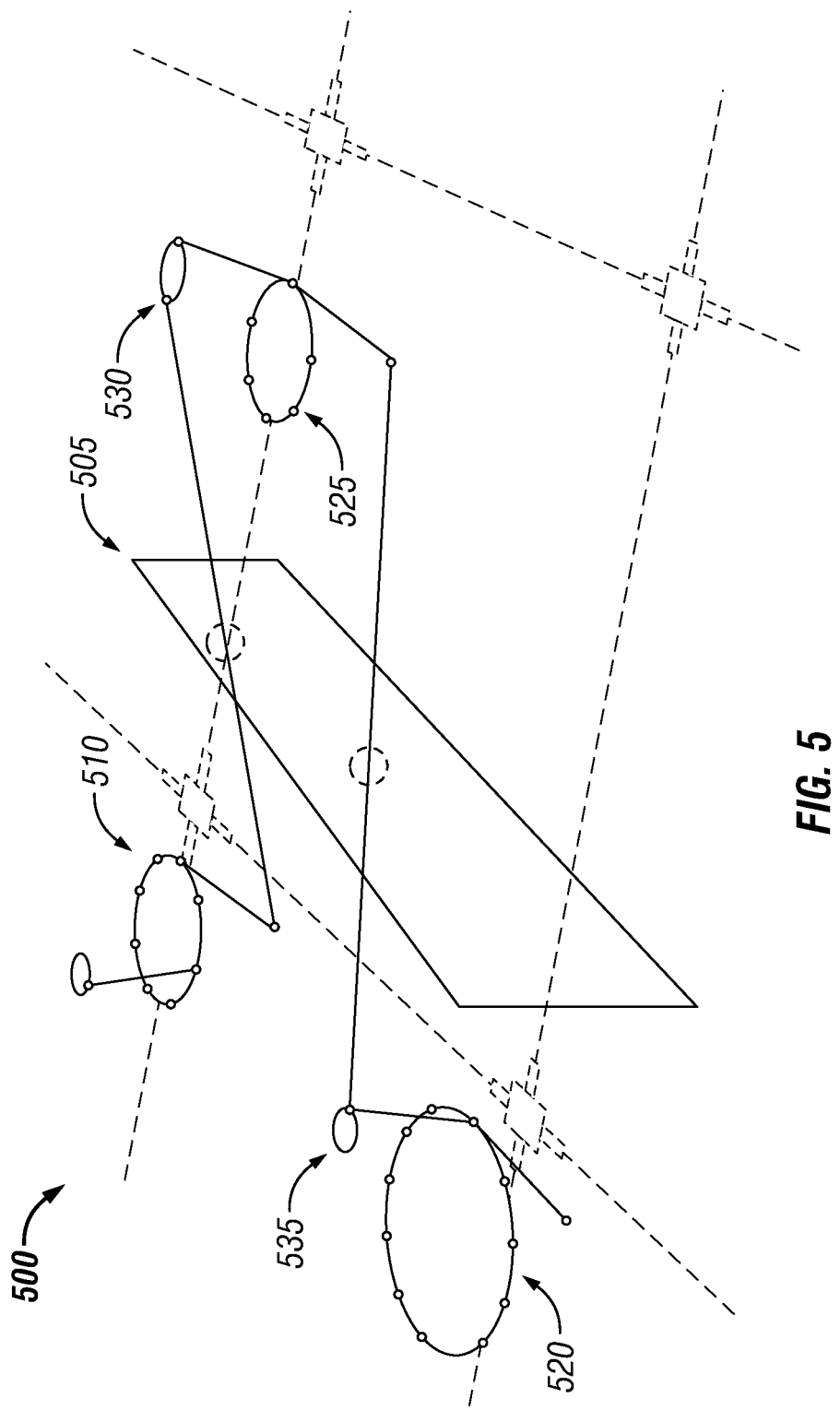
FIG. 5 illustrates a visualization of client and server code interactions.

FIG. 5 illustrates a visualization 500 comprising a client and server communicating. A partition 505 may illustrate data communication between the client and server. Server node 520 may connect to client node 525 through partition 505. As illustrated in FIG. 5, the function calls, or data passing, between the client and server, or between client nodes, is illustrated by a connecting line. Server node 520 may call server node 535 which may call client node 525 through partition 505. Client node 525 may call client node 530 which may then communicate back to the server through partition 505 to server node 510. The visualization of the client server relationship may be accomplished by parsing and tokenizing as previously described.

In another embodiment, a code check-in system may be provided by the visualizer. In an embodiment a ground plane may be displayed with a group of parent nodes and child nodes displayed therein. Color coding may allow a user to see changes to the code between two source code repository check-ins. Some nodes and links may be color coded to indicate that they were removed, some may be color coded indicating they were changed, and may be color coded indicating they are new. Additional colors may be used to indicate additional features of the check-in system including code conflicts and blames.

In an embodiment, a checkpoint function may be added to points of interest in the source code file to monitor the execution path of the program. For example, a function that sets an unused variable or advances a counter or any other function may be used. When the parser recursively walks the file directory, each occurrence of the checkpoint function may be logged into the metadata file as a child node. The visualizer may recognize the checkpoint function and thereby provide the user with the ability to see every time the checkpoint function is referenced. The visualizer may display each occurrence in sequence, allowing a user to watch the progression of data across all visible nodes. The visualizer may, for example, animate a logical path from node to node following the execution path where the checkpoint function is referenced. The execution path may look like a path of lightning along the limbs of a tree, for example. A user may easier follow the program logic and be therefore become aware of how a programming error or bug manifests. If, for example, the program runs out of system resources such as memory, the programming error may be readily recognized through setting the checkpoint function at a suspected problem area in the code.

In another embodiment comprising the checkpoint function, all areas of the visualization may be initially one color, and a slider or other input may allow a user to monitor a logical path. As the slider or input is modulated, a logical path from one node to another may change color, such as to red, for example, with red connections between the nodes. This methodology may allow a user to visually monitor a program's behavior. The nodes may be illuminated based on an external connection, pipe, or file, so the user may either monitor the program in real time or play it back at a later time. In the event the user needed to play back a recording of the logic, additional code may be inserted into the source code that may log function calls serially. This may allow a user to then view those changes by loading a metadata file.

In another embodiment, the user may use this to view the interaction between two different languages, two different instances of the same program, two different products, or client server combination. In this embodiment, two ground planes may be visible, with source code displayed as illustrated above, with the additional change that some nodes from one ground plane may connect to nodes on the other ground plane, indicating communication. In this way, a user may see the way a server communicates with a client, or a database communicates with a server. It may also be used to bridge the gap between two different languages. Lines in this case between the two sets of source code would be displayed in a different color so they can be readily seen by the user.

In another embodiment, the visualizer may color high resource use components of code such as recursion and destroying objects before they are used. These kinds of issues may be highlighted in a different color, so a user may readily identify them. A third dimension may be used to display flags and structures indicating file ownership, classes, namespaces, and other contextual information. The size of these structures may be scalable such that more complicated nodes may be displayed as larger structures. These structures may be in the form of organic tree-like paths or large blocks.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of computer code visualization, the method comprising:
   parsing a client side source code file comprising a plurality of client side computer code lines;
   identifying a client side operation in the client side source code file;
   generating a client side metadata file, the client side metadata file comprising:
   a node ID for the client side operation;
   a parent ID for the client side operation; and
   a child ID for the client side operation;
   tokenizing the client side source code file and generating a client side tokenized file, the client side tokenized file comprising:

tokens corresponding the client side operation in the client side source code file;
parsing a server side source code file comprising a plurality of server side computer code lines;
identifying a server side operation in the server side source code file;
generating a server side metadata file, the server side metadata file comprising:
a node ID for the server side operation;
a parent ID for the server side operation; and
a child ID for the server side operation;
tokenizing the server side source code file and generating a server side tokenized file, the server side tokenized file comprising:
tokens corresponding to the server side operation in the server side source code file;
matching cadence of at least at least one of the tokens in the client side tokenized file to at least one of the tokens in the server side tokenized file and generating a symbolic link between the node ID for the client side operation and the node ID for the server side operation corresponding to the matched tokens; and
generating a visualization based on the symbolic link.

2. The method of claim 1, wherein the step of identifying the operation comprises:
parsing consecutive lines of code in the source code file until a line delimiter is reached, thereby identifying the operation bounded by a first line of code from the consecutive lines of code and the line delimiter.

3. The method of claim 2, wherein the line delimiter is programming language specific.

4. The method of claim 2, wherein the step of parsing consecutive lines of code comprises generating a string from the parsed code and storing the string in memory.

5. The method of claim 4, further comprising:
comparing the string against a list of valid operations for a programming language the source code is written in, and determining if the string comprises a valid operation.

6. The method of claim 5, further comprising:
identifying an arguments list from the string if the string contains a valid operation and writing the arguments list to the metadata file, thereby associating the arguments list with the node ID of the operation.

7. The method of claim 1, wherein the step of generating a metadata file comprises:
identifying each operation in the source code file;
assigning each operation a node ID;
determining if an operation is a dependent operation;
associating the node ID for each dependent operation with the node ID which the operation depends from, thereby indicating the dependent operation as a child node ID associated with the parent node ID from which it depends.

8. The method of claim 1, wherein the step of generating a visualization from the metadata file comprises:
displaying each operation as a connection of nodes, the connection of nodes being defined by connecting each parent node ID to each child node ID.

9. The method of claim 1, further comprising:
calculating a weight of each node ID.

10. The method of claim 9, wherein calculating a weight comprises:
summing the number of child IDs associated with a parent ID.

* * * * *